Patented Nov. 28, 1933

1,936,755

UNITED STATES PATENT OFFICE 1,936,755

CONCENTRATION OF DILUTE ALIPHATIC ACIDS

Henry Dreyfus, London, England

No Drawing. Application February 10, 1931, Serial No. 514,901, and in Great Britain May 2, 1930

16 Claims. (Cl. 260—122)

This invention relates to the concentration of dilute aliphatic acids, and especially to the concentration of dilute acetic acid, by processes of the kind in which the concentration is effected or aided by means of solvents for the acids.

I have now found that ethers of phenols can be employed with especial advantage for the concentration of dilute aliphatic acids or for the isolation of such aliphatic acids from their dilute aqueous solutions, owing to their high boiling point (of the order of about 200–300° C. or more), their low solubility or substantial insolubility in water, and their high solvent power for aliphatic acids.

According to the invention I concentrate dilute aliphatic acids or isolate aliphatic acids from their dilute aqueous solution by treating said dilute acids or aqueous solutions thereof with one or more ethers of phenols. As examples of such ethers of phenols may be mentioned α-naphthol-methylether, α-naphthol-ethylether, α-naphthol-propylether, β-naphthol-methylether, β-naphthol-ethylether, β-naphthol-propylether, β-naphthol-iso-propylether, β-naphthol-paratolyl-ether, phenetol, anisol, phenol-phenyl or cresol-cresyl-ethers, e. g. ortho-cresol-cresylether, meta-cresol-cresylether, para-cresol-cresylether, mixtures of the isomeric cresol-cresyl-ethers or mixtures of any two or more of such phenol ethers.

In performing the invention I may for instance first mix the dilute aliphatic acid or aqueous solution of the aliphatic acid with one or more of the phenol ethers, whereby the aliphatic acid is largely or entirely extracted by the phenol ether or ethers, and thereafter I may, after separating the aqueous layer, subject the layer of the phenol ether or ethers containing the dissolved or extracted aliphatic acid to fractional distillation.

I do not limit myself as to the temperatures to be employed in the mixing of the dilute aliphatic acid (or aqueous solution of the aliphatic acid) as ordinary temperatures, e. g. 15–20° C. or higher temperatures such for instance as 50–90° C. may be used for this purpose.

Preferably, however, I pass dilute or aqueous aliphatic acid in vapour form through or otherwise in contact with the phenol ether or ethers maintained at a temperature at which the water remains in gaseous or vapour form and by these means the aliphatic acid can be largely or entirely absorbed from the vapours while allowing the water to escape in vapour form. In such a method of execution of the invention I may pass the vapours of the dilute or aqueous aliphatic acid through or otherwise in contact with the phenol ether or ethers maintained at a temperature intermediate between the boiling points of water and of the aliphatic acid-phenol ether or ethers mixture under the conditions obtaining.

The vapour of the dilute or aqueous acid can of course be brought in contact with the phenol ether or ethers in any convenient way, as for instance by passing the vapour in a stream through the hot phenol ether or ethers, or for instance the vapour can be caused to pass up one or more fractionating columns down which the phenol ether or ethers are caused to pass in the form of a stream, spray or current.

The phenol ether or ethers used for absorbing or separating the aliphatic acid can be treated in any convenient way for recovering the absorbed aliphatic acid. Thus, for instance, the phenol ether or ethers may be heated to drive off the aliphatic acid or may be subjected to fractional distillation after being removed from the apparatus.

Preferably, however, I effect the recovery of the aliphatic acid by combining the recovery with the absorption by circulating the phenol ether or ethers from the absorption zone through apparatus heated to a higher temperature, whereby the aliphatic acid may be partially or entirely separated or distilled off from the phenol ether or ethers, and then returning the phenol ether or ethers to the absorption zone, thus maintaining a continuous circulation of the phenol ether or ethers and continuous recovery of the aliphatic acid.

As a modification of such form of execution of the invention I may mix dilute or aqueous aliphatic acid in vapour form with the vapours of one or more phenol ethers at a temperature above the boiling point (under the conditions obtaining) of the aliphatic acid, and thereafter cool the resulting mixture to a temperature intermediate between the boiling point of water and the aliphatic acid-phenol ether or ethers mixture under the conditions obtaining, whereby in this case also the aliphatic acid can be continuously recovered while enabling the water to remain in vapour form.

It must be understood that I do not restrict myself as to the concentration of the acetic or other aliphatic acid treated in accordance with the present invention. The process of the invention, besides enabling a "glacial" or highly concentrated acid to be readily produced from relatively concentrated acids, such for instance as 70–80% aqueous acetic or other aliphatic acid, provides a valuable means whereby there can be concentrated in a highly satisfactory manner very dilute acids, e. g. 5-10% aqueous acetic, propionic or other aliphatic acids, and especially waste dilute acetic acids such as result from the industrial acetylation of cellulose or other acetylation processes.

What I claim and desire to secure by Letters Patent is:

1. Process for concentrating an aqueous aliphatic acid which comprises subjecting the aqueous aliphatic acid to treatment with a solvent for the acid which solvent comprises essentially at least one ether of a monohydric phenol.

2. Process for concentrating aqueous acetic acid which comprises subjecting the aqueous acetic acid to treatment with a solvent for the acid which solvent comprises essentially at least one ether of a monohydric phenol.

3. Process for concentrating an aqueous aliphatic acid which comprises mixing the aqueous aliphatic acid in liquid form with a solvent for the acid which solvent comprises essentially at least one ether of a monohydric phenol and thereafter removing the aqueous layer formed and subjecting the solvent layer containing dissolved aliphatic acid to fractional distillation.

4. Process for concentrating aqueous acetic acid which comprises mixing the aqueous acetic acid in liquid form with a solvent for the acid, which solvent comprises essentially at least one ether of a monohydric phenol, and thereafter removing the aqueous layer formed and subjecting the solvent layer containing dissolved acetic acid to fractional distillation.

5. Process for concentrating an aqueous aliphatic acid which comprises passing the aqueous aliphatic acid in vapor form in contact with a solvent for the acid, which solvent comprises essentially at least one ether of a monohydric phenol, maintained at a temperature at which water remains in vapor form.

6. Process for concentrating aqueous acetic acid which comprises passing the aqueous acetic acid in vapor form in contact with a solvent for the acid, which solvent comprises essentially at least one ether of a monohydric phenol, maintained at a temperature at which water remains in vapor form.

7. Process for continuously concentrating an aqueous aliphatic acid which comprises passing the aqueous aliphatic acid in vapor form in contact with a solvent for the acid, which solvent comprises essentially at least one ether of a monohydric phenol, maintained at a temperature at which the water remains in vapor form, continuously removing the solvent containing absorbed acid and heating it to distil off at least partially the acid and thereafter returning the solvent for treatment of further aqueous aliphatic acid.

8. Process for continuously concentrating aqueous acetic acid which comprises passing the aqueous acetic acid in vapor form in contact with a solvent for the acid, which solvent comprises essentially at least one ether of a monohydric phenol, maintained at a temperature at which the water remains in vapor form, continuously removing the solvent containing absorbed acid and thereafter returning the solvent for treatment of further aqueous acetic acid.

9. Process according to claim 1, characterized in that the vapors of the aqueous aliphatic acid are mixed with the vapors of a solvent for the acid, which solvent comprises essentially at least one ether of monohydric phenol, at a temperature about the boiling point (under the conditions obtaining) of the aliphatic acid and that the resulting mixture is cooled to a temperature intermediate between the boiling point of the water and the aliphatic acid-solvent mixture under the conditions obtained.

10. Process according to claim 2, characterized in that the vapors of the aqueous acetic acid are mixed with the vapors of a solvent for the acid, which solvent comprises essentially at least one ether of monohydric phenol, at a temperature about the boiling point (under the conditions obtaining) of the acetic acid and that the resulting mixture is cooled to a temperature intermediate between the boiling point of the water and the acetic acid-solvent mixture under the conditions obtaining.

11. Process for concentrating an aqueous fatty acid which comprises subjecting the aqueous fatty acid to treatment with a solvent for the acid which solvent comprises essentially at least one ether of phenol.

12. Process for concentrating an aqueous fatty acid which comprises subjecting the aqueous fatty acid to treatment with a solvent for the acid which solvent comprises essentially at least one alkyl ether of phenol.

13. Process for concentrating an aqueous fatty acid which comprises subjecting the aqueous fatty acid to treatment with a solvent for the acid which solvent comprises essentially at least one ether of a cresol.

14. Process for concentrating an aqueous fatty acid which comprises subjecting the aqueous fatty acid to treatment with a solvent for the acid which solvent comprises essentially at least one aryl ether of a cresol.

15. Process for concentrating an aqueous fatty acid which comprises subjecting the aqueous fatty acid to treatment with a solvent for the acid which solvent comprises essentially at least one ether of a naphthol.

16. Process for concentrating an aqueous fatty acid which comprises subjecting the aqueous fatty acid to treatment with a solvent for the acid which solvent comprises essentially at least one alkyl ether of a naphthol.

HENRY DREYFUS.